July 12, 1955    K. W. GUEBERT    2,712,985
PRODUCTION OF CARBON BISULFIDE
Filed May 28, 1951
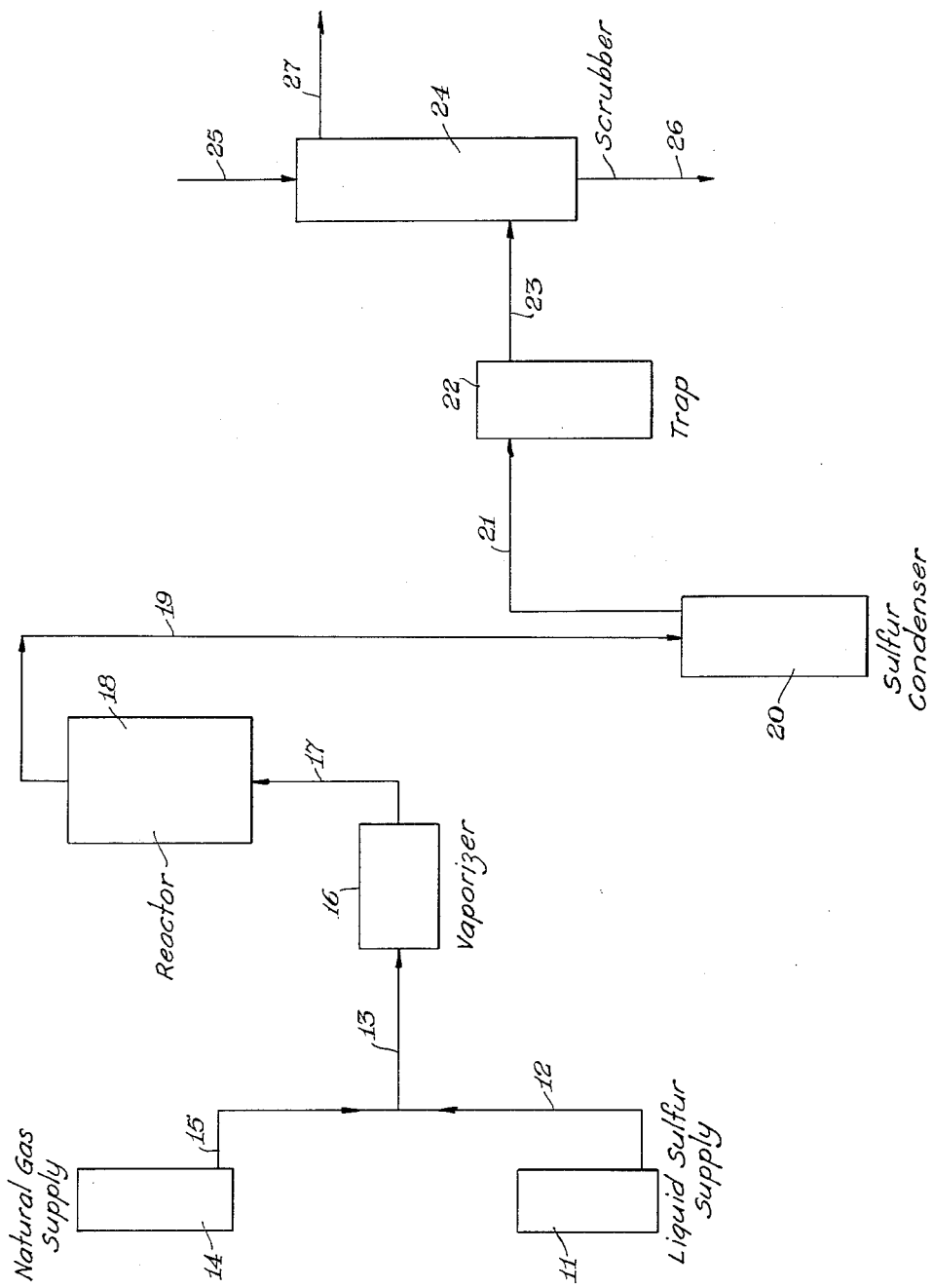
INVENTOR.
Kenneth W. Guebert
BY
Griswold & Burdick
ATTORNEYS United States Patent Office 2,712,985
Patented July 12, 1955

2,712,985
PRODUCTION OF CARBON BISULFIDE

Kenneth W. Guebert, Freeport, Tex., assignor to The Dow Chemical Company, Midland, Mich., a corporation of Delaware Application May 28, 1951, Serial No. 228,734

4 Claims. (Cl. 23—206)

This invention relates to the production of carbon bisulfide, and, more particularly, to a novel catalytic process for the manufacture thereof from sulfur and a parafinic hydrocarbon.

It was known prior to the present invention that paraffinic hydrocarbons and sulfur, in liquid phase or in vapor phase, would react at elevated temperatures to produce carbon bisulfide and hydrogen sulfide. It was also known that this reaction was catalyzed by certain agents, such as silica gel, fuller's earth, bauxite, activated alumina, copper phosphate, ziroconium phosphate, and thorium phosphate.

The present invention is based upon the discovery of a novel catalytic agent for the reaction between sulfur and a paraffinic hydrocarbon.

According to the invention carbon bisulfide is produced by contacting a vapor phase mixture of sulfur and a paraffinic hydrocarbon with zirconium silicate at a temperature from 500 to 700° C. Zirconium silicate occurs naturally and is commercially available in relatively pure form.

The process of the invention may be more readily understood by reference to the accompanying drawing, which is a schematic flow sheet illustrating the production of carbon bisulfide, using a zirconium silicate catalyst.

Liquid sulfur from a supply 11 flows through a line 12 and into a line 13 where it is mixed with natural gas from a supply 14 which flows through a line 15 into the line 13. The natural gas-sulfur mixture passes through the line 13 into a vaporizer 16, and from thence through a line 17 to a reactor 18 packed with the zirconium silicate catalyst. Reaction products pass from the reactor through a line 19 to a condenser 20 where any unreacted sulfur is removed. Products remaining pass from the sulfur condenser through a line 21 to a cooled trap 22 where carbon bisulfide and some hydrogen sulfide are condensed and collected. The remaining products, mainly $H_2S$, then flow through a line 23 to a scrubber 24 where hydrogen sulfide is absorbed by dilute aqueous sodium hydroxide passed into the scrubber through a line 25. Relatively dilute sodium sulfide passes from the bottom of the scrubber through a line 26. Any remaining gas leaves the system through a vent 27.

The method of the invention is suitable for the production of carbon bisulfide at temperatures ranging from 500 to 700° C. However, it is preferred to carry out the process at temperatures from 560 to 600° C., as reaction proceeds at a practical rate within the above temperature range, and corrosion of metallic reaction apparatus is minimized. The reaction proceeds satisfactorily at atmospheric pressure, although either reduced or elevated pressures can be used if desired.

It is practical to carry out the process of the invention using a space velocity from 200 to 1200. Space velocity is defined as the ratio of total volume of the gases, calculated at 0° C. and 760 mm. Hg total pressure, passed over the catalyst per hour divided by the apparent volume of the catalyst. Within the above range, the selection of a lower space velocity results in a higher yield, but a lower production rate per unit of reactor volume. Accordingly, the space velocity used in a given application is a compromise between these two factors. It is usually preferred that the space velocity be from 700 to 900.

In general, any available source of paraffinic hydrocarbon gases can be used in carrying out the process of the invention. Natural gas provides a convenient supply, preferably a natural gas high in methane. Although it is feasible to carry out the reaction of the invention using a substantial excess either of sulfur or of the paraffinic hydrocarbon, it is usually preferred to use from 90 to 110 per cent of the sulfur theoretically required to convert all the carbon in the paraffinic hydrocarbon to carbon bisulfide, and all the hydrogen therein to hydrogen sulfide.

Example

Carbon bisulfide was produced from a Texas natural gas containing about 90 per cent by volume of methane by passing a vapor mixture of sulfur and the natural gas, in a weight ratio of about 15 parts of natural gas per 100 parts of sulfur, over zirconium silicate particles of from 8 to 14 mesh U. S. Sieve Series, at a space velocity of 890. The per cent conversion of natural gas charged to carbon bisulfide was found to be a function of temperature, ranging from 44 per cent conversion at a reaction temperature of 530° C., to 60 per cent conversion at a reaction temperature of 562° C., 82 per cent conversion at a reaction temperature of 604° C., and 88 per cent conversion at a reaction temperature of 616° C.

I claim:

1. A method of producing carbon bisulfide that comprises contacting a vapor phase mixture of sulfur and a paraffinic hydrocarbon with a catalyst consisting of particles of zirconium silicate at a temperature from 500 to 700° C.

2. A method as claimed in claim 1 in which the temperature is from 560 to 600° C.

3. A method of producing carbon bisulfide that comprises contacting a vapor phase mixture of sulfur and methane with a catalyst consisting of particles of naturally occurring zirconium silicate at a temperature from 560 to 600° C.

4. A method as claimed in claim 3 in which the space velocity is from 200 to 1200.

References Cited in the file of this patent

UNITED STATES PATENTS

| 2,079,543 | Bley | May 4, 1937 |
| 2,187,393 | De Simo | Jan. 16, 1940 |
| 2,330,934 | Thacker | Oct. 5, 1943 |
| 2,369,377 | Thacker | Feb. 13, 1945 |
| 2,428,727 | Thacker | Oct. 7, 1947 |
| 2,437,352 | Fragen | Mar. 9, 1948 |
| 2,481,493 | Blue | Sept. 13, 1949 |
| 2,565,215 | Folkins et al. | Aug. 21, 1951 |

OTHER REFERENCES

Kalichersky: "Chemical Refining of Petroleum," 1933, pages 173–177.